A. FILSHIE.
NAIL.
APPLICATION FILED JULY 15, 1912.

1,072,107. Patented Sept. 2, 1913.

Inventor
Alick Filshie

UNITED STATES PATENT OFFICE.

ALEXANDER FILSHIE, OF ATKINSON, ILLINOIS.

NAIL.

1,072,107.

Specification of Letters Patent.

Patented Sept. 2, 1913.

Application filed July 15, 1912. Serial No. 709,530.

*To all whom it may concern:*

Be it known that I, ALEXANDER FILSHIE, citizen of the United States, residing at Atkinson, in the county of Henry and State of Illinois, have invented certain new and useful Improvements in Nails, of which the following is a specification.

This invention relates to nails and has as its object to provide a nail particularly well adapted for use in securing corrugated iron roofing, and walling sheet metal cornice work and flashing in place. At present the ordinary iron or wire nail is employed for this purpose but there is a marked disadvantage attending its use. In the first place, the opening formed by the nail when driven through iron or sheet metal work is slightly larger than the nail, affording a space through which rain and dew may enter and come in contact with the unpainted or otherwise unprotected inner side of the work which will in time result in its becoming rusted. Furthermore, such nails being of iron will themselves rust and in time the nail openings will become larger than the nail and the work will no longer be held in place. The present invention, therefore, aims to provide a nail which may be as conveniently used as the ordinary nail and which when driven into place will completely plug or close the nail opening and thus prevent the entrance of moisture behind the work. This result is secured by forming the head of the nail of lead or other soft metal which is not liable to rust or to be otherwise destroyed. The nail head being of metal which will not rust, the metal work through which the nail is driven adjacent to the head of the nail will not be liable to rust.

For a full understanding of the invention reference is to be had to the following description and accompanying drawing, in which:—

Figure 1:
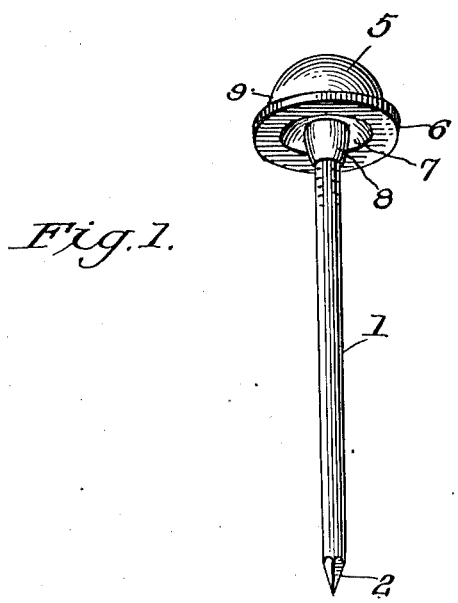
Figure 2:
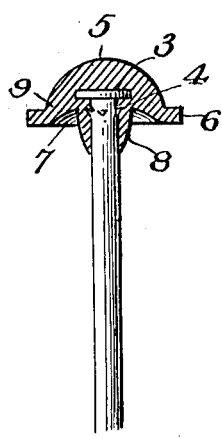

Figure 1 is a perspective view of the nail embodying the present invention. Fig. 2 is a vertical transverse sectional view through the head end of the nail.

Corresponding and like parts are referred to in the following description and indicated in all the views of the accompanying drawing by the same reference characters.

In the drawing, the shank of the nail is indicated at 1 and is preferably in the nature of an ordinary wire nail either round or square in cross section as may be preferred, and this shank is provided with the usual pointed entering end 2. The head at the opposite end of the shank is indicated at 3 and has the form of the ordinary wire nail head. The shank is formed beneath the head 3 with spurs 4 which project laterally and upwardly from the shank and serve a purpose to be presently explained.

The head proper of the nail is indicated at 5 and as before stated is preferably formed of lead or other soft metal not liable to corrode. The head 3 and the head end of the shank 1 are embedded in the head 5 in the manner illustrated in Fig. 2 of the drawing, as are also the spurs 4, these spurs serving to reinforce the connection of the head 5 with the headed end of the shank 1 and to prevent rotation of the head 5 upon the shank or to prevent rotation of the shank within the head.

The head 5 has its upper or driving face of substantially semicircular form and is provided at its base with a circumscribing flange 6 which is preferably relatively thin. The under side of the head 5 is concaved as indicated at 7 and projecting from the under side at the center of the concavity 7 is a substantially conoidal neck 8 in which the adjacent portion of the nail shank 1 is embedded, as clearly shown in Fig. 2. This neck 8 extends below the plane of the under side of the head 5, and at its lower end merges with the outer surface of the shank 5.

When the nail herein shown and described is driven into place, the neck 8 will be forced into the opening formed by the shank 1 and, being of soft metal, will completely plug or fill this opening, thereby preventing the entrance of moisture through the opening. It will be observed that the outer edge of the wall of the concavity 7 is concentric with respect to and located inwardly of the bevel edge of the head 5 at the point of juncture of the flange 6 therewith, so that the head is not only relatively thin throughout the flange 6 but is gradually decreased in thickness in the direction of the flange, as for example at 9. Consequently, when the nail is driven home, there will be a tendency for the flange 6 and the portion of the head immediately inwardly thereof to flatten out or otherwise conform to the surface against which the head is driven and consequently a water tight seal is formed between the head and the material surrounding the nail opening.

Having thus described the invention what is claimed as new is:—

1. A nail including a shank and a head, the head being of relatively soft metal and having a neck projecting from the under side thereof and surrounding the head end of the shank.

2. A nail including a shank and a head, the head being of relatively soft metal and having a neck projecting from the under side thereof and surrounding the head end of the shank, the under side of the head being formed with a concavity extending about the periphery.

3. A nail including a shank and a head, one end of the shank being embedded in the head, the head being of relatively soft metal and being formed with a neck projecting below the plane of the under side thereof and surrounding the embedded end of the shank.

4. A nail including a shank and a head, one end of the shank being embedded in the head, the head being of relatively soft metal and being formed with a neck projecting below the plane of the under side thereof and surrounding the embedded end of the shank, the under side of the head being formed with a concavity surrounding the neck.

5. A nail including a shank and a head, the head being of relatively soft metal and being formed in its under side with a recess and at its periphery with a flange.

6. A nail including a shank and a head, the head being of relatively soft metal and having a circumscribing relatively thin flange located at its periphery.

In testimony whereof I affix my signature in presence of two witnesses.

ALICK FILSHIE. [L. S.]

Witnesses:
 WILLIAM RILEY,
 THOMAS H. TAYLOR.